(12) United States Patent
Yang

(10) Patent No.: US 11,107,079 B2
(45) Date of Patent: *Aug. 31, 2021

(54) METHODS, SYSTEMS, APPARATUSES AND DEVICES FOR VERIFYING CREDIBILITY OF CONSORTIUM BLOCKCHAIN

(71) Applicant: Advanced New Technologies Co., Ltd., George Town (KY)

(72) Inventor: Xinying Yang, Hangzhou (CN)

(73) Assignee: Advanced New Technologies Co., Ltd., Grand Cayman (KY)

(*) Notice: Subject to any disclaimer, the term of this patent is extended or adjusted under 35 U.S.C. 154(b) by 0 days.

This patent is subject to a terminal disclaimer.

(21) Appl. No.: 17/162,707

(22) Filed: Jan. 29, 2021

(65) Prior Publication Data

US 2021/0158351 A1 May 27, 2021

Related U.S. Application Data

(63) Continuation of application No. PCT/CN2019/116188, filed on Nov. 7, 2019.

(30) Foreign Application Priority Data

Dec. 28, 2018 (CN) .......................... 201811628699.0

(51) Int. Cl.
   *G06Q 20/40* (2012.01)
   *G06Q 20/38* (2012.01)
   *H04L 9/32* (2006.01)

(52) U.S. Cl.
   CPC ....... *G06Q 20/401* (2013.01); *G06Q 20/3827* (2013.01); *H04L 9/3236* (2013.01);
   (Continued)

(58) Field of Classification Search
   CPC . G06Q 20/401; G06Q 20/3827; H04L 9/3236
   See application file for complete search history.

(56) References Cited

U.S. PATENT DOCUMENTS 10,826,709 B1 * 11/2020 Zhuo ..................... H04L 9/0637
10,929,374 B2 * 2/2021 Zhang ..................... G06F 16/22
(Continued)

FOREIGN PATENT DOCUMENTS

| CN | 105488665 | 4/2016 |
|----|-----------|--------|
| CN | 106452785 | 2/2017 |

(Continued)

OTHER PUBLICATIONS

Al-Bassam et al. (Fraud Proofs: Maximising Light Client Security and Scaling Blockchains with Dishonest Majorities, arXiv: 1809.09044v1 [cs.CR] Sep. 24, 2018, 33 pages) (Year: 2018).*

(Continued)

*Primary Examiner* — Oleg Korsak
(74) *Attorney, Agent, or Firm* — Fish & Richardson P.C.

(57) ABSTRACT

Methods, systems and apparatus, including computer programs encoded on computer storage media, for verifying credibility of a consortium blockchain, including obtaining, by a client device of a consortium blockchain that comprises a plurality of nodes, respective addresses of the plurality of nodes; sending, by the client device, a simplified payment verification (SPV) request to each node of the plurality of nodes based on the respective addresses of the plurality of nodes, wherein each SPV request comprises a digest hash of the transaction; receiving, at the client device, a respective verification result returned by each node of the plurality of nodes that received the SPV request; and determining, by the client device, credibility of the consortium blockchain based on a consistency degree of the respective verification results returned by the plurality of nodes.

18 Claims, 5 Drawing Sheets

(52) U.S. Cl.
CPC ...... *G06Q 2220/00* (2013.01); *H04L 2209/38* (2013.01); *H04L 2209/56* (2013.01)

(56) References Cited

U.S. PATENT DOCUMENTS

| | | | | |
|---|---|---|---|---|
| 10,931,462 | B2* | 2/2021 | Qiu | H04L 9/3263 |
| 2016/0330034 | A1* | 11/2016 | Back | H04L 9/3255 |
| 2018/0109541 | A1 | 4/2018 | Gleichauf | |
| 2018/0359096 | A1* | 12/2018 | Ford | H04L 9/3236 |
| 2019/0081793 | A1* | 3/2019 | Martino | H04L 9/0894 |
| 2019/0123892 | A1* | 4/2019 | Basu | H04L 9/0637 |
| 2019/0238525 | A1* | 8/2019 | Padmanabhan | G06F 21/6245 |
| 2020/0201560 | A1* | 6/2020 | Yang | H04L 9/32 |
| 2020/0328889 | A1* | 10/2020 | Matetic | H04L 9/3236 |
| 2021/0012336 | A1* | 1/2021 | Zhuo | G06Q 20/401 |

FOREIGN PATENT DOCUMENTS

| | | |
|---|---|---|
| CN | 106503053 | 3/2017 |
| CN | 106503981 | 3/2017 |
| CN | 106850622 | 6/2017 |
| CN | 106878000 | 6/2017 |
| CN | 107077674 | 8/2017 |
| CN | 107426157 | 12/2017 |
| CN | 108681900 | 10/2018 |
| CN | 108683630 | 10/2018 |
| CN | 108696502 | 10/2018 |
| CN | 108805571 | 11/2018 |
| CN | 109067541 | 12/2018 |
| CN | 110046901 | 7/2019 |
| GB | 2549085 | 10/2017 |
| TW | 201807601 | 3/2018 |

OTHER PUBLICATIONS

Ye (bitcoinj—Do we have to trust at least one DNS seed?—Bitcoin Stack Exchange, Jul. 6, 2017, 2 pages) (Year: 2017).*

Decker et al. (Information Propagation in the Bitcoin Network, IEEE, 2013, 10 pages) (Year: 2013).*

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

PCT International Search Report and Written Opinion in International Application No. PCT/CN2019/116188, dated Feb. 1, 2020, 13 pages (with partial English translation).

* cited by examiner

METHODS, SYSTEMS, APPARATUSES AND DEVICES FOR VERIFYING CREDIBILITY OF CONSORTIUM BLOCKCHAIN

CROSS-REFERENCE TO RELATED APPLICATIONS

This application is a continuation of PCT Application No. PCT/CN2019/116188, filed on Nov. 7, 2019, which claims priority to Chinese Patent Application No. 201811628699.0, filed on Dec. 28, 2018, and each application is hereby incorporated by reference in its entirety.

TECHNICAL FIELD

The present disclosure relates to a field of information technology, and in particular to methods, systems, apparatuses and devices for verifying credibility of consortium blockchain.

BACKGROUND

In a consortium blockchain, there generally exist a plurality of nodes that are greatly different in function. For example, in one consortium blockchain with copyright storage, there may include work release node, copyright registration node, copyright transfer node and notarization node and so on. Based on the different needs of users, there is only one of such nodes to connect with the user and this node is considered as a connected node of the user. For example, the user can release one transaction through an application program (APP) released by a node, and perform consortium blockchain storage for the transaction through the connected node. This connected node is also usually used to perform subsequent verification.

In this process, it is difficult for the user to perceive other nodes in the entire consortium blockchain and the user usually has less interest in other nodes. According to the user experience, transaction completion and verification seem to proceed with the connected node as center and therefore the user may have doubt about the credibility of the connected node and the consortium blockchain.

As a result, a solution for allowing a user to verify credibility of a consortium blockchain is needed.

SUMMARY

In order to overcome the problem of poor experience of a user in credibility verification of a consortium blockchain in the existing technology and improve the user experience, the embodiments of the present specification provide a solution for allowing the user to verify credibility of the consortium blockchain. According to a first aspect of the solution, there is provided a method of verifying credibility of a consortium blockchain. After a client device generates a transaction and performs on-chain storage for the transaction by a connected node, the method includes the following steps.

The client device obtains addresses of a plurality of nodes in the consortium blockchain;

A simplified payment verification (SPV) request is sent to a plurality of nodes based on the addresses of the plurality of nodes, wherein the SPV request includes a digest hash of the transaction;

Any node receiving the SPV request performs an SPV verification based on the digest hash to verify whether the transaction is present in the consortium blockchain, and return a verification result to the client device;

The client device determines credibility of the consortium blockchain based on a consistency degree of verification results returned by the plurality of nodes respectively.

According to a second aspect, the embodiments of the present specification further provide a method of verifying credibility of a consortium blockchain. After a user generates a transaction and performs on-chain storage for the transaction by a connected node, the method includes the following steps.

Addresses of a plurality of nodes in the consortium blockchain are obtained;

A simplified payment verification (SPV) request is sent to a plurality of nodes based on the addresses of the plurality of nodes, wherein the SPV request includes a digest hash of the transaction;

Credibility of the consortium blockchain is determined based on a consistency degree of verification results returned by the plurality of nodes respectively.

According to a third aspect, the embodiments of the present specification further provide a method of processing a request in a consortium blockchain. When a node is one node in the consortium blockchain, the method includes the following:

The node determines a user identifier of a user of the node and determines a whitelist formed of the user identifiers, where the user identifier is used to identify a user identity and identify a node connected with the user.

The whitelist is sent to other nodes in the consortium blockchain so that other nodes can determine whether to perform a request sent by a user of a non-self-node based on the whitelist, where the request includes a transaction position inquiry request or an SPV request, a digest hash of a target transaction is included in the request.

Corresponding to the first aspect, the embodiments of the present specification further provide a system for verifying credibility of a consortium blockchain, including a client device and a consortium blockchain network. The consortium blockchain network includes a plurality of nodes. After a client device generates a transaction and performs on-chain storage for the transaction by a connected node, the method includes the following steps.

The client device obtains addresses of a plurality of nodes in the consortium blockchain;

A simplified payment verification (SPV) request is sent to a plurality of nodes based on the addresses of the plurality of nodes, wherein the SPV request includes a digest hash of the transaction;

Any node in the consortium blockchain network receiving the SPV request performs SPV verification based on the digest hash to verify whether the transaction is present in the consortium blockchain, and return a verification result to the client device;

The client device determines credibility of the consortium blockchain based on a consistency degree of verification results returned by the plurality of nodes respectively.

Corresponding to the second aspect, the embodiments of the present specification further provide an apparatus for verifying credibility of a consortium blockchain. After a user generates a transaction and performs on-chain storage for the transaction by a connected node, the apparatus includes the following modules:

obtaining module, configured to obtain addresses of a plurality of nodes in the consortium blockchain;

sending module, configured to send an SPV request to a plurality of nodes based on the addresses of the plurality of nodes, where the SPV request includes a digest hash of the transaction;

receiving module, configured to receive verification results returned by the plurality of nodes respectively;

verifying module, configured to determine credibility of the consortium blockchain based on a consistency degree of the verification results returned by the plurality of nodes respectively.

Corresponding to the third aspect, the embodiments of the present specification further provide an apparatus for processing a request in a consortium blockchain. The apparatus is located at a node of the consortium blockchain. The apparatus includes:

determining module, configured to determine, by the node, a user identifier of a user of the node and determine a whitelist formed of user identifiers, where the user identifier is used to identify a user identity and identify a node connected with the user;

sending module, configured to send the whitelist to other nodes in the consortium blockchain, so that the other nodes determines whether to perform a request sent by a user of a non-self-node based on the whitelist, where the request includes a transaction position inquiry request or an SPV request, a digest hash of a target transaction is included in the request.

In the solution of the embodiments of the present specification, after the client device completes on-chain storage of a transaction through the connected node, the client device sends an SPV request to a plurality of nodes in the consortium blockchain for verifying whether the transaction is on the consortium blockchain, so as to obtain respective verification results of the plurality of nodes for the transaction. Further, the client device verifies credibility of the consortium blockchain based on a consistency degree of the SPV verification results of the plurality of nodes, thereby improving the user experience.

It is noted that the above general descriptions and the subsequent detailed descriptions are merely illustrative and explanatory and shall not constitute any limitation to the embodiments of the present specification.

Further, any one example of the embodiments of the present specification does not need to achieve all above effects.

BRIEF DESCRIPTION OF THE DRAWINGS

In order to help understand the technical solutions in the embodiments of the present specification or in the existing technology, the accompanying drawings required for descriptions of the examples and the existing technology will be briefly described below. It is apparent that the accompanying drawings described below are merely some examples of the embodiments of the present specification, and those skilled in the art may obtain other accompanying drawings based on these drawings.

DETAILED DESCRIPTION

In order to help the persons skilled in the art to better understand the technical solutions of the present disclosure, the technical solutions of the present disclosure will be detailed below in combination with the accompanying drawings of the embodiments of the present specification. Obviously, the examples described herein are merely some of embodiments of the present specification rather than all examples. All other examples obtained by those skilled in the art based on the embodiments of the present specification shall fall within the scope of protection of the present disclosure.

A consortium blockchain usually includes a plurality of different functional nodes. At present, the consortium blockchain usually employs the following architecture: the functional nodes are oriented to their respective users and the users access the consortium blockchain through functional nodes of their interest.

In the consortium blockchain of the embodiments of the present specification, all nodes are considered as participating in a routing function of a consortium blockchain network. At the same time, the nodes can participate in other functions, for example, each node can participate in verification and propagation of transactions and block information, find and maintain connection with the connected node and locally store a complete consortium blockchain and some data relating to the consortium blockchain.

Figure 1:
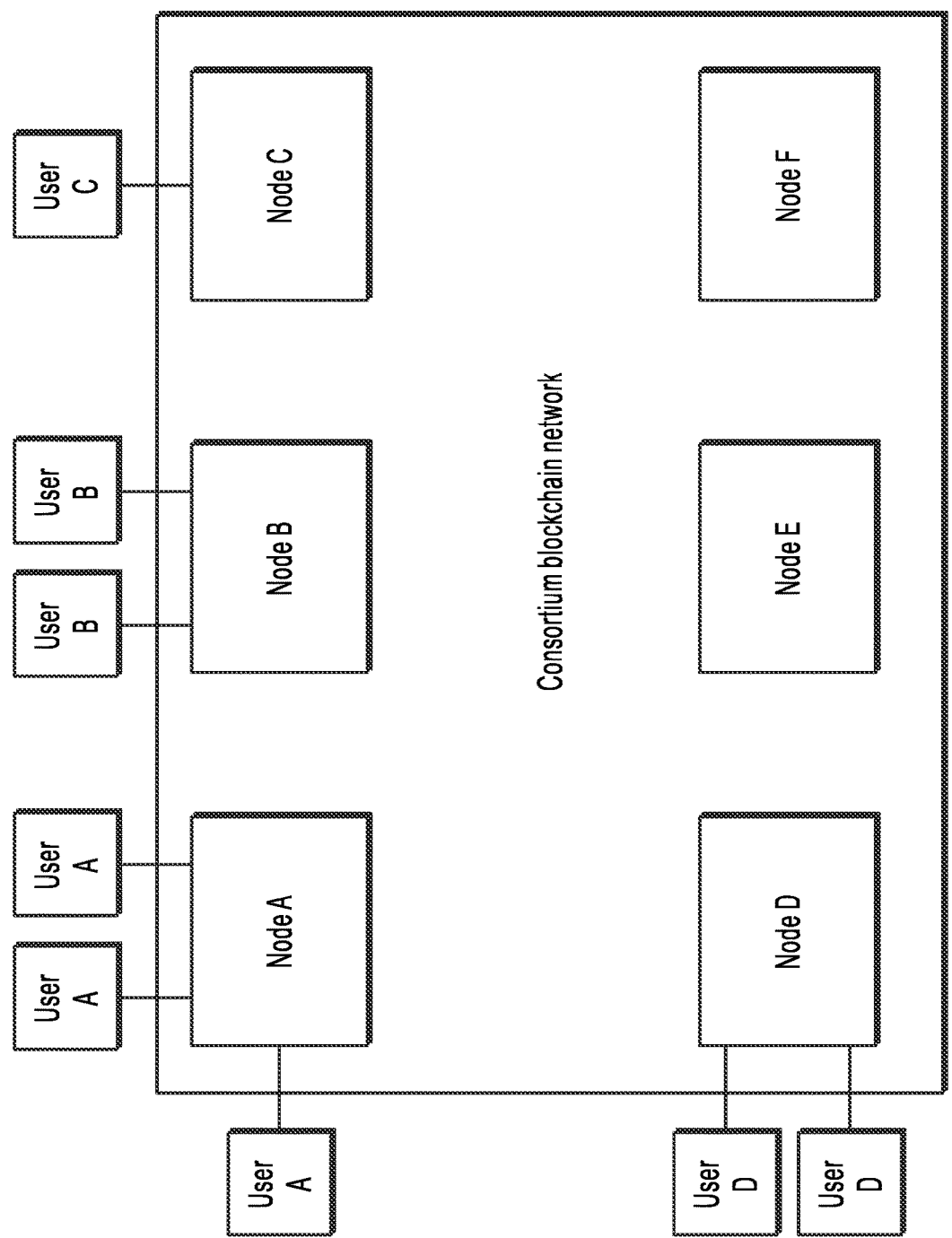
FIG. 1 is a schematic diagram of an architecture of an existing consortium blockchain.

FIG. 1 is a schematic diagram of an architecture of an existing consortium blockchain. As shown in FIG. 1, the nodes in the consortium blockchain network can contain different functions. Because different nodes provide different functions, the users to which these nodes are oriented are usually also different. In a same consortium blockchain, each functional node usually develops its own application program (APP) to allow its user of the node to register and access. Generally, the user selects one node to connect with the consortium blockchain to perform transaction release and verification.

Figure 2:
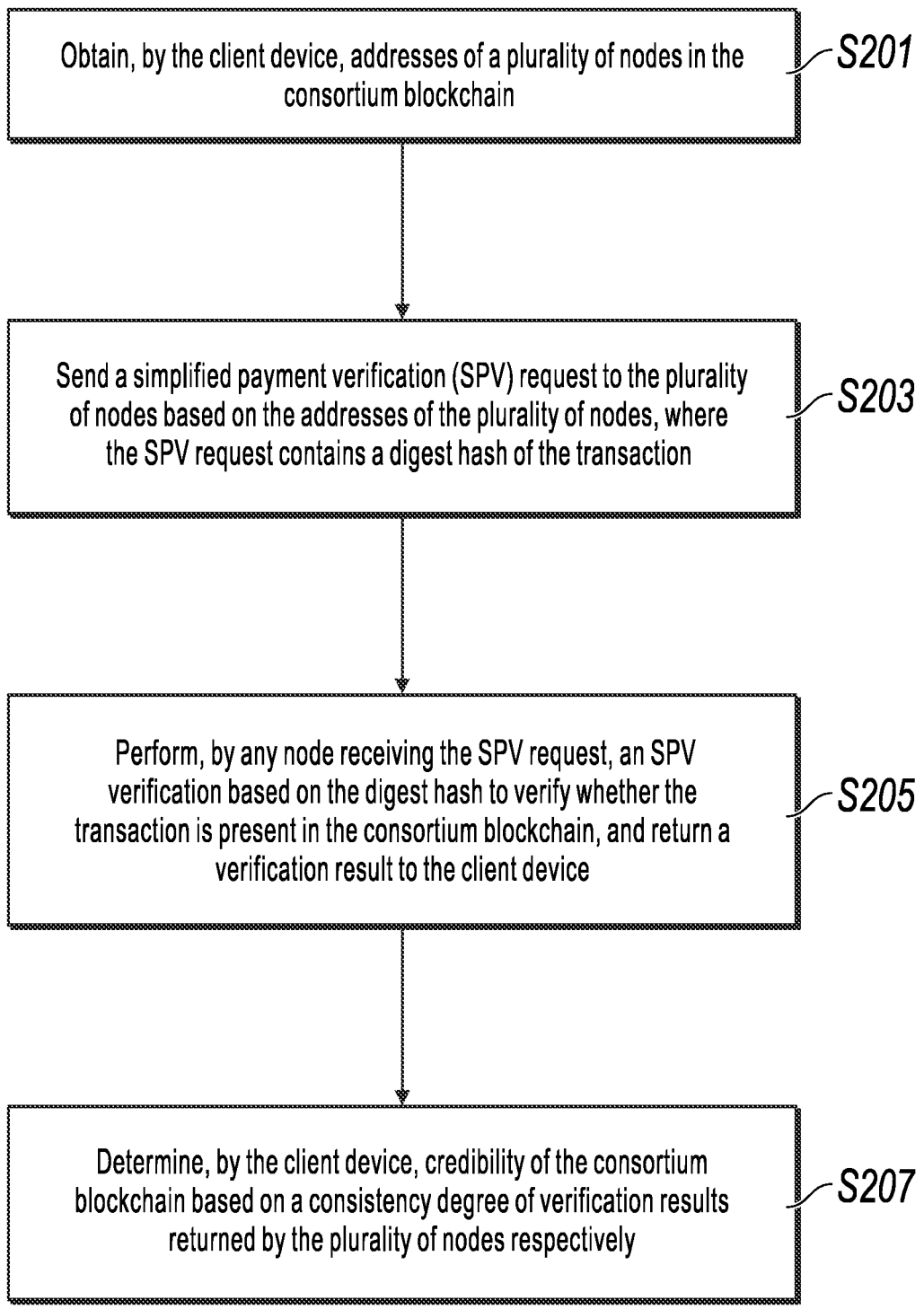
FIG. 2 is a flowchart of a method of verifying credibility of a consortium blockchain according to a system aspect of some embodiments of the present specification.

The technical solution of the embodiments of the present specification will be detailed below in combination with accompanying drawings. A first aspect of the technical solution of the examples of the resent disclosure is as shown in FIG. 2. FIG. 2 is a flowchart of a method of verifying credibility of a consortium blockchain based on a system aspect of the embodiments of the present specification. After a client device generates a transaction and performs on-chain storage for the transaction by a connected node, the method includes the following steps.

S201, the client device obtains addresses of a plurality of nodes in the consortium blockchain.

The client device knows the address of the connected node and can obtain other node addresses in the consortium blockchain by sending a request to the connected node. The other node addresses can also be obtained in other manners, for example, all nodes in the consortium blockchain advertises their own addresses to a public cloud, and the client device regularly obtain the addresses of all nodes from the public cloud to update an address list locally stored by the client device. Therefore, the client device can select addresses of a plurality of nodes from the address list at any time. In this way, the client device can circumvent the connected node of the client device, thereby improving the trust degree of the user on the entire consortium blockchain.

S203, a simplified payment verification (SPV) request is sent to the plurality of nodes based on the addresses of the plurality of nodes, where the SPV request contains a digest hash of the transaction.

After the user completes a transaction and performs on-chain storage through the connected node, the user will receive a notification message about one stored transaction and store the message locally at the client device, where the notification message generally contains a digest hash. As a result, the client device can always obtain the digest hash locally and add it into the SPV request.

After receiving the notification message, the client device can initiate an SPV request based on an instruction of the user, or trigger the SPV request upon receiving the notification message.

S205, any node receiving the SPV request performs an SPV verification based on the digest hash to verify whether the transaction is present in the consortium blockchain and returns a verification result to the client device.

Each block of the blockchain contains all transactions recorded in the block and can indicate them in the form of Merkle tree. All transactions in the block will be data-hashed and then hash values are stored in a corresponding leaf node. Each leaf node in the tree characterizes one transaction. One leaf node in the tree characterizes one corresponding transaction present in the block. In order to prove a particular target transaction present in the block, one node only needs to calculate $\log_2 N$ hash values to form one Merkle path from the target transaction to the tree root.

It is not necessary for a node to store all transaction or download the entire block during processing an SPV. The node can only store a block header and verify whether the target transaction is present in the block based on the hash and the Merkle path of the target transaction. In other words, The SPV verification result of each node is a binary result, that is, Yes or No.

Further, any one node can receive a request directly from a client device or receive a request of the client device forwarded by other nodes in the consortium blockchain.

S207, the client device determines credibility of the consortium blockchain based on a consistency degree of verification results returned by the plurality of nodes respectively.

Generally, one transaction is either present or absent in the consortium blockchain. Theoretically, when the blockchain has no problems, the SPV verification results returned by the nodes shall be exactly same. Thus, a stringent credibility confirmation manner is that if all SPV verification results are consistent, i.e. yes, the consortium blockchain is confirmed to be credible and otherwise non-credible. Of course, due to some reasons such as network and device, a given error can be permitted. For example, a threshold can be set. When the consistency "yes" of the SPV verification results exceeds the threshold, the consortium blockchain is confirmed to be credible.

Further, the consortium blockchain is confirmed to be non-credible, an alert can be given. Specifically, the alert message can indicate a degree of inconsistency of the verification results of the nodes (i.e. what are results of yes and no), and specifically give the nodes inconsistent with the majority of results, and the verification results of such nodes. Further, a credibility value can be calculated as a reference based on a degree of inconsistency of all returned results. For example, if there are no same verification results accounting for more than 95% in the returned results, the credibility of the consortium blockchain is considered as zero, or the ratio of the same verification results to the returned results is taken as the credibility of the consortium blockchain.

In the technical solution of the embodiments of the present specification, after the user completes on-chain storage of a transaction through a connected node, the user initiates an SPV request to a plurality of nodes in the consortium blockchain for this transaction to obtain respective SPV verification results of the plurality of nodes for this transaction. Furthermore, the user can verify the credibility of the consortium blockchain based on a degree of consistency of SPV verification results of the plurality of nodes, thereby improving user experience.

In a specific implementation, the client device obtains addresses of a plurality of nodes in the consortium blockchain, can be:

the client device randomly obtains addresses of a plurality of nodes in the consortium blockchain. Verification with randomly-obtained node addresses, on one hand, makes the verification results fairer, on the other hand, enables the requests of the users to averagely flow to different nodes, thereby avoiding excessive load of some nodes with more users. Alternatively, the client device obtains addresses of a plurality of nodes including the address of the connected node in the consortium blockchain and in this case, the user can firstly select one group of node addresses and then add the address of the connected node into the group. When the connected node is added for verification, the returned results also include the verification result of the connected node, so that the verification is more specific, improving the user experience.

In a specific implementation, the client device can also send a transaction position inquiry request to a plurality of nodes based on the addresses of the plurality of nodes, where the transaction position inquiry request contains a digest hash of the transaction; any one node receiving the position inquiry request inquires position information of the transaction corresponding to the digest hash in the consortium blockchain respectively based on the digest hash and returns the position inquiry result to the client device; the client device verifies the credibility of the consortium blockchain containing the transaction information based on a degree of consistency of the position inquiry results returned by the plurality of nodes respectively.

One blockchain is formed of a plurality of blocks, each of which usually contains a plurality of transactions. Therefore, in the embodiments of the present specification, the position information specifically refers to which block of the blockchain stores the transaction and what position of the storage in the block.

In the blockchain, different blocks can be identified in several manners, for example, by a block header hash value or block height. The block header hash value is a hash value obtained by perform hash calculation for a block header and the hash value is used to uniquely and expressly identify one block. In the blockchain, the block height of the first block is generally 0 and will be increased by 1 for addition of each block. One block usually has a definite block height. Therefore, the block header hash value or the block height can be stored, as part of a block metadata, in an independent database table in a node to facilitate indexing and faster searching of the block.

At the same time, since one block usually contains a plurality of transactions, address offsets of various transactions in the block can be used to identify the transactions in the block. Obviously, the address offsets of the transactions in the same block are different.

Further, after on-chain storage is performed in the block where the transaction is located, one data table shaped like (transaction digest hash, block header hash value, address offset), or (transaction digest hash, block height, address offset) can be maintained among different nodes so that a corresponding block identifier and the address of the transaction in the bock can be obtained based on the digest hash of the transaction. In other words, the node can determine the position of the transaction in the consortium blockchain based on the digest hash of the transaction.

Of course, since the specific format of the blockchain can be self-defined, the contents of the position information will be different under different block formats, which does not constitute limitation to the solution.

Since one transaction only has one definite position in the consortium blockchain, the credibility of the consortium blockchain can be determined based on a degree of consistency of inquiry results. Theoretically, the position information returned by various nodes shall be identical. One stringent verification manner can be that if all position inquiry results are consistent, the consortium blockchain is credible. Of course, a given error can be permitted for reasons such as network and device. For example, the degree of consistency is calculated based on all returned results; if there are no same inquiry results accounting for more than 95% in the returned results, the credibility of the consortium blockchain is considered as 0, or, the ratio of the same results to the returned results is taken as the credibility of the consortium blockchain.

Further, when the consortium blockchain is confirmed to be non-credible, an alert can be given. Specifically, the alert message can indicate a degree of inconsistency of the verification results of the nodes (i.e. what number of results or what ratio is inconsistent with the majority of results), and specifically give the nodes inconsistent with the majority of results, and the inquiry results of such nodes.

It is noted that the solution of verifying based on the consistency of position inquiry results and the solution of verifying based on the consistency of SPV verification results can be performed separately at the same time. In an actual operation, the verification results of the two solutions are independent from each other. In other words, during simultaneous implementation of the two verification solutions, only when the results of the two verification solutions satisfy a consistency condition at the same time can the consortium blockchain be considered as credible. And during verification, the two solutions can be performed in any order.

In the consortium blockchain, each functional node usually has its own connected client devices and corresponding connected users. In the solution of the embodiments of the present specification, each node often needs to process a request from a user of the non-self-node.

In some implementations, a node can process an inquiry request or an SPV request from any client device connected to the node. In another implementation, based on the principle of consortium sharing, each node can also provide inquiry service or SPV service to the users of the whitelist.

If a client device sending a request is on the whitelist, the request will be processed, and otherwise will be rejected. The whitelist is used to confirm a user type of the client device as an unlawful user or a lawful user. The lawful user includes the user of the node and users of other nodes. In other words, based on the whitelist, the node can confirm that the client device sending a request is an unlawful user, a lawful user of the node or a lawful user of non-self-node.

The whitelist users can be confirmed in the following manner including but not limited to: any node in the consortium blockchain determines its own whitelist, and broadcasts the whitelist to other nodes in the consortium blockchain, so that the other nodes can determine whether to perform SPV verification based on the whitelist. A common processing manner is as follows: any node in the consortium blockchain confirms its own registered users as whitelist users and broadcasts them. The other nodes will determine whether to perform further processing based on whether a client device identifier contained in a request is a whitelist user. The whitelist herein can take node as a minimum unit or user as a minimum unit. The whitelist users stored in different nodes can be identical or different. The node only processes the requests from the whitelist users.

For example, it is assumed that there are four nodes A, B, C and D in the consortium blockchain. In the above solution, the nodes B, C and D can confirm the connected users of the node A as whitelist users which are maintained by the four nodes; or, the whitelist users of the node B contain the users of the node A but the whitelist users of the nodes C and D does not contain the users of the node A. The specific situation can be determined based on service situation.

In a general circumstance, the connected users of the governmental organization (for example, public notary office) or welfare organization (for example, charity organization) node can be the whitelist users of other nodes in the consortium blockchain. Additionally, the connected users of a service partner node of one node can also be the whitelist users of such node. Further, each node can perform permission grading for the whitelist users based on user source or historical behavior data or other factors (for example, a third party credit evaluation score), so that, for example, the whitelist users with lowest permission only has inquiry permission, and the whitelist users with higher permission can also have further permissions and so on.

In actual application, in one consortium blockchain, the connected users of various nodes can be different, for example, some nodes have more connected users while some nodes have fewer connected users. Generally, the number of the connected users of those nodes oriented to market is always more than the number of the connected users of some backend nodes. For example, in a consortium blockchain for protecting copyrights, a work release platform facing authors always has far more registered users than the public notary office.

In this case, based on the solution of the embodiments of the present specification, the nodes in the consortium are not always fair for request processing. In other words, the nodes with fewer registered users always receive a number of requests exceeding the responsibility of the nodes, which is unfavorable for the nodes with fewer registered users.

At this time, in an implementation, before receiving and deciding to process a request, any one node can firstly determine a first processing number of times of the node for a position inquiry request initiated by users of other nodes and determine a second processing number of times of other nodes for a position inquiry request initiated by a user of the node; and determine whether to process the position inquiry request in delay based on the first processing number of times and the second processing number of times.

The first processing number of times and the second processing number of times can be based on a period of time, for example, daily or monthly, and cleared to zero regularly, and can also be based on statistics of all historical data. A condition for determining whether to process in delay can be that a contribution ratio calculated based on the first processing number of times X and the second processing number of times Y is compared with a predetermined threshold, where for example, Z=(X−Y)/Y, or, Z=X/Y or the like. The contribution ratio characterizes a ratio of "self contribution" to a "requesting others" when a node processes a request. Once the contribution ratio exceeds the threshold, it indicates that the node already makes more contribution, and the node can process, in delay, those requests received from the users of other nodes. Processing request in delay can effectively decrease the load of a weak node (i.e. a node with fewer registered users, which usually has weak processing capacity for large flow). In the solution of the embodiments of the present specification, the client device does not need to obtain verification results instantaneously, therefore various nodes can process requests asynchronously, and the delayed processing does not affect the effect of the solution of the embodiments of the present specification.

In an implementation, when selecting a plurality of nodes, the client device may select the same node continuously many times. In this manner, the client device can determine whether the number of times of sending the transaction position inquiry request to the node reaches a threshold. If the threshold is reached, the transaction position inquiry request will be sent to the node in delay. The number of times of sending request can be calculated for a period of time, or all historical number of times is calculated. In this manner, the client device can avoid requesting another node continuously, thereby decreasing the impact on the load of the another node.

Figure 3:
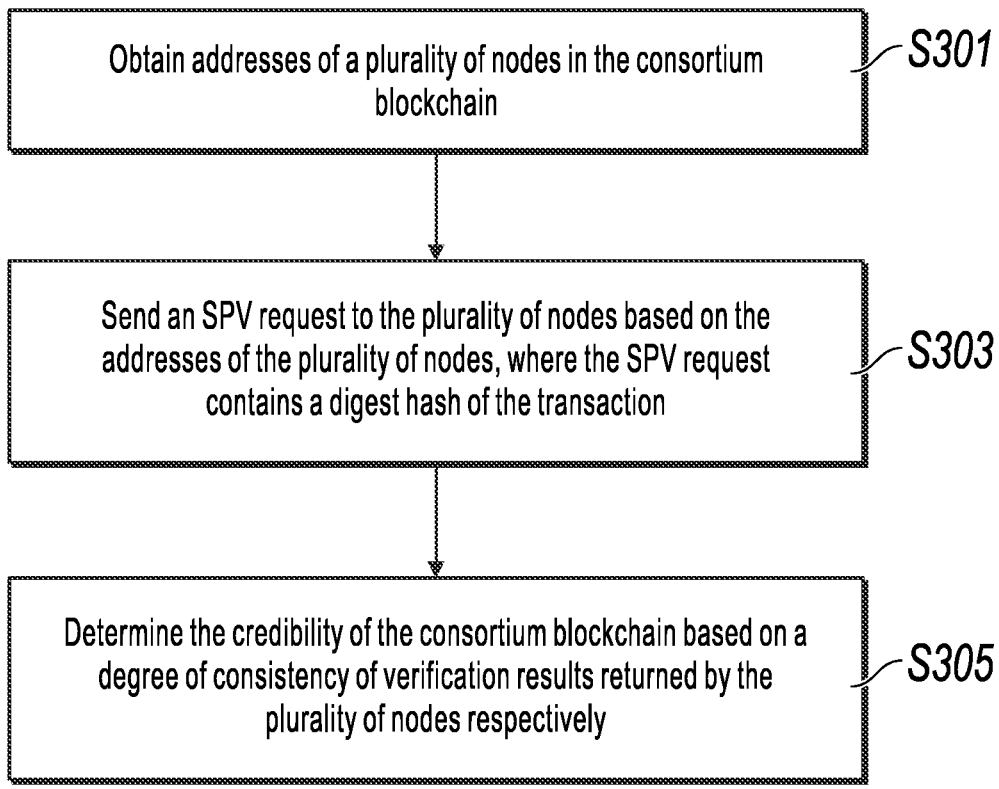
FIG. 3 is a flowchart of a method of verifying credibility of a consortium blockchain according to a client device aspect of some embodiments of the present specification.

The second aspect of the embodiments of the present specification is as shown in FIG. 3. FIG. 3 is a flowchart of a method of verifying credibility of a consortium blockchain based on a client device aspect of the embodiments of the present specification. After a user generates a transaction and performs on-chain storage for the transaction by a connected node, the method includes the following steps:

S301, addresses of a plurality of nodes in the consortium blockchain are obtained in the following specific manner, including but not limited to: randomly obtaining addresses of a plurality of nodes in the consortium blockchain; or, obtaining addresses of a plurality of nodes containing an address of the connected node in the consortium blockchain.

S303, an SPV request is sent to the plurality of nodes based on addresses of the plurality of nodes, where the SPV request contains a digest hash of the transaction.

S305, the credibility of the consortium blockchain is determined based on a degree of consistency of verification results returned by the plurality of nodes respectively.

Further, the above method includes: sending a transaction position inquiry request to the plurality of nodes based on addresses of a plurality of nodes, where the transaction position inquiry request contains a digest hash of the transaction; and verifying the credibility of the consortium blockchain containing the transaction information based on a degree of consistency of position inquiry results returned by the plurality of nodes respectively.

Further, sending the SPV request to the plurality of nodes in step S303 includes: determining whether a number of times of sending the SPV request to any one node of the plurality of nodes reaches a threshold, and if yes, the SPV request will be sent to the node in delay.

Figure 4:
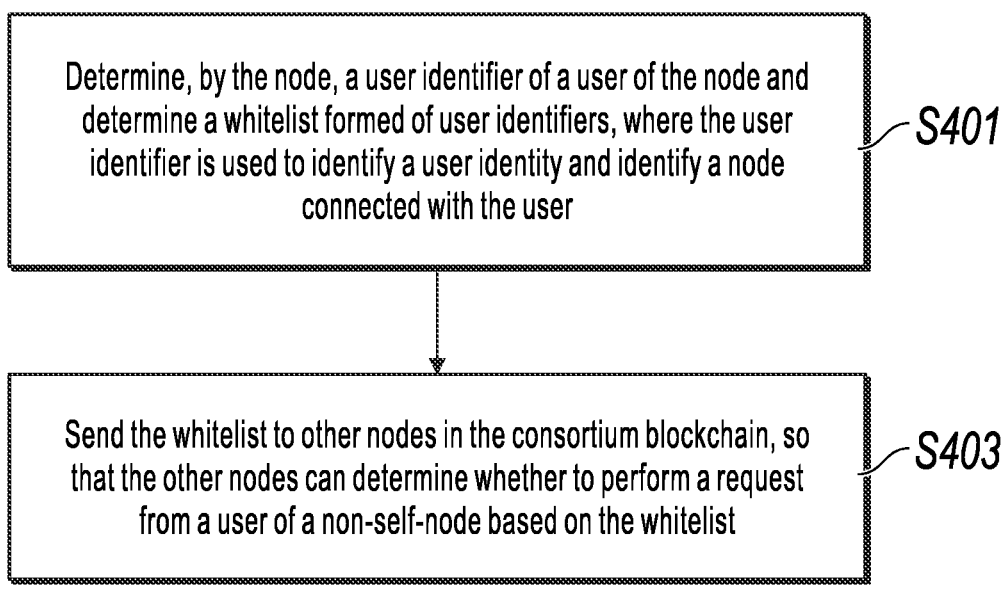
FIG. 4 is a flowchart of a method of processing a request in a consortium blockchain according to some embodiments of the present specification.

The third aspect of the solution of the embodiments of the present specification is as shown in FIG. 4. FIG. 4 is a flowchart of a method of processing a request in a consortium blockchain according to some embodiments of the present specification. After a user generates a transaction and performs on-chain storage for the transaction by a connected node, the method includes the following steps:

S401, the node determines a user identifier of a user of the node and determines a whitelist formed of user identifiers, where the user identifier is used to identify a user identity and identify a node connected with the user. In the consortium blockchain, the user identifier contains the information of the connected node in a pre-agreed format, for example, a different serial number can be added to the beginning of the user identifier to indicate the connected node of the user.

S403, the whitelist is sent to other nodes in the consortium blockchain, so that the other nodes can determine whether to perform a request from a user of a non-self-node based on the whitelist, where the request includes a position inquiry request or an SPV request. a digest hash of a target transaction is included in the request.

Further, the method includes receiving, by a node, a request from any user, where the request also includes a user identifier; and determining the user identifier is in the whitelist, and if no, rejecting the request.

Further, the above method includes: receiving a request from any user, where the request further includes a user identifier; when the user corresponding to the user identifier is a user of a non-self-node:

determining a first processing number of times of the node for the requests initiated by the users of other nodes, and determining a second processing number of times of other nodes for the requests initiated by the user of the node; and determining whether to process the request in delay based on the first processing number of times and the second processing number of times.

Corresponding to the first aspect, the embodiments of the present specification further provide a system for verifying credibility of a consortium blockchain, including a client device and a consortium blockchain network. The consortium blockchain network includes a plurality of nodes. After a client device generates a transaction and performs on-chain storage for the transaction by a connected node, the method includes the following steps.

The client device obtains addresses of a plurality of nodes in the consortium blockchain;

A simplified payment verification (SPV) request is sent to a plurality of nodes based on the addresses of the plurality of nodes, wherein the SPV request includes a digest hash of the transaction;

Any node in the consortium blockchain network receiving the SPV request performs an SPV verification based on the digest hash to verify whether the transaction is present in the consortium blockchain, and return a verification result to the client device;

The client device determines credibility of the consortium blockchain based on a consistency degree of verification results returned by the plurality of nodes respectively.

Further, in the system, the client device randomly obtains addresses of a plurality of nodes in the consortium blockchain; or the client device obtains addresses of a plurality of nodes containing an address of the connected node in the consortium blockchain.

Further, in the system, the client device sends a transaction position inquiry request to the plurality of nodes based on the addresses of the plurality of nodes, where the transaction position inquiry request contains a digest hash of the transaction; any node receiving the position inquiry request inquires position information of a transaction corresponding to the digest hash in the consortium blockchain respectively based on the digest hash respectively, and returns a position inquiry result to the client device; the client device verifies the credibility of the consortium blockchain containing the transaction information based on a degree of consistency of position inquiry results returned by the plurality of nodes respectively.

Further, in the system, before the client device obtains addresses of a plurality of nodes in the consortium blockchain, any node in the consortium blockchain determines its own whitelist and broadcast the whitelist to other nodes in the consortium blockchain, so that the other nodes can determine whether to perform the SPV verification processing based on the whitelist; the SPV request contains a digest hash of the transaction, and further, the SPV request contains the digest hash of the transaction and the client device identifier; after receiving the SPV request, any one node can further determine whether the client device identifier contained in the SPV request is in the whitelist; and if no, reject the SPV verification request.

Further, in the system, the node determines the first processing number of times of the node for the SPV initiated by the users of other nodes, and a second processing number of times of the other nodes for the SPV initiated by the user of the node; and determines whether to process the SPV request in delay based on the first processing number of times and the second processing number of times.

Further, in the system, the client device may determine whether the number of times of sending the SPV request to the node reaches a threshold. If the threshold is reached, the SPV request will be sent to the node in delay.

Figure 5:
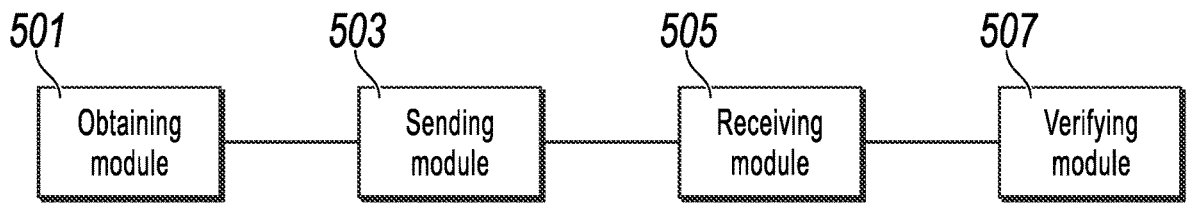
FIG. 5 is a structural schematic diagram of an apparatus for verifying credibility according to some embodiments of the present specification.

Corresponding to the second aspect, the embodiments of the present specification further provide an apparatus for verifying credibility of a consortium blockchain. FIG. 5 is a structural schematic diagram of an apparatus for verifying credibility according to some embodiments of the present specification. After a user generates a transaction and performs on-chain storage for the transaction by a connected node, the apparatus includes the following modules:

obtaining module 501, configured to obtain addresses of a plurality of nodes in the consortium blockchain;

sending module 503, configured to send an SPV request to a plurality of nodes based on the addresses of the plurality of nodes, where the SPV request includes a digest hash of the transaction;

receiving module 505, configured to receive verification results returned by the plurality of nodes respectively;

verifying module 507, configured to determine credibility of the consortium blockchain based on a consistency degree of the verification results returned by the plurality of nodes respectively.

Further, the obtaining module 501 is configured to randomly obtain addresses of a plurality of nodes in the consortium blockchain; or obtain addresses of a plurality of nodes containing an address of the connected node in the consortium blockchain.

Further, the sending module 503 is configured to send a transaction position inquiry request to the plurality of nodes based on the addresses of the plurality of nodes, where the transaction position inquiry request contains a digest hash of the transaction; the receiving module 505 is configured to receive position inquiry results returned by the plurality of nodes respectively; the verifying module 507 is configured to verify the credibility of the consortium blockchain containing the transaction information based on a degree of consistency of position inquiry results returned by the plurality of nodes.

Further, the sending module 503 is configured to: determine whether a number of times of sending the SPV request to any one node of the plurality of nodes reaches a threshold; and if yes, send the SPV request to the node in delay.

Figure 6:
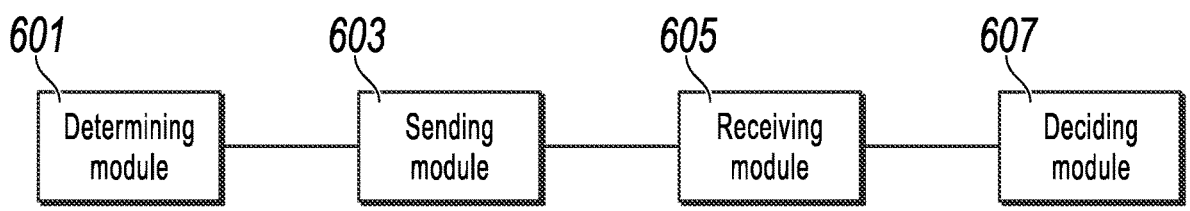
FIG. 6 is a structural schematic diagram of an apparatus for processing a request according to some embodiments of the present specification.

Corresponding to the third aspect, the embodiments of the present specification provide an apparatus for processing a request in a consortium blockchain. The apparatus is on a node of the consortium blockchain as shown in FIG. 6. FIG. 6 is a structural schematic diagram of an apparatus for processing a request in a consortium blockchain according to some embodiments of the present specification. The apparatus includes the following modules:

determining module 601, configured to determine, by the node, a user identifier of a user of the node, and determine a whitelist formed of user identifiers, where the user identifier is used to identify a user identity and identify a node connected with the user; and sending module 603, configured to send the whitelist to other nodes in the consortium blockchain so that the other nodes determine whether to perform a request from a user of a non-self-node based on the whitelist, where the request includes a transaction position inquiry request or an SPV, a digest hash of a target transaction is included in the request.

Further, the apparatus includes a receiving module 605 configured to receive a request from any user, where the request further includes a user identifier; and a deciding module 607 configured to determine the user identifier is in the whitelist and if no, reject the request.

Further, the receiving module 605 receives a request from any user, where the request further includes a user identifier. When the user corresponding to the user identifier is a user of a non-self-node: the determining module 601 is further configured to determine a first processing number of times of the node for the request initiated by the users of other nodes, and a second processing number of times of the other nodes for the request initiated by the user of the node; and the deciding module 607 is further configured to determine whether to process the request in delay based on the first processing number of times and the second processing number of times.

The embodiments of the present specification further provide a computer device, including at least a memory, a processor and computer programs stored on the memory and operable on the processor. The programs are executed by the processor to implement the method of verifying the credibility of the consortium blockchain of FIG. 3.

The embodiments of the present specification further provide a computer device, including at least a memory, a processor and computer programs stored on the memory and operable on the processor. The programs are executed by the processor to implement the method of processing a request in the consortium blockchain of FIG. 4.

Figure 7:
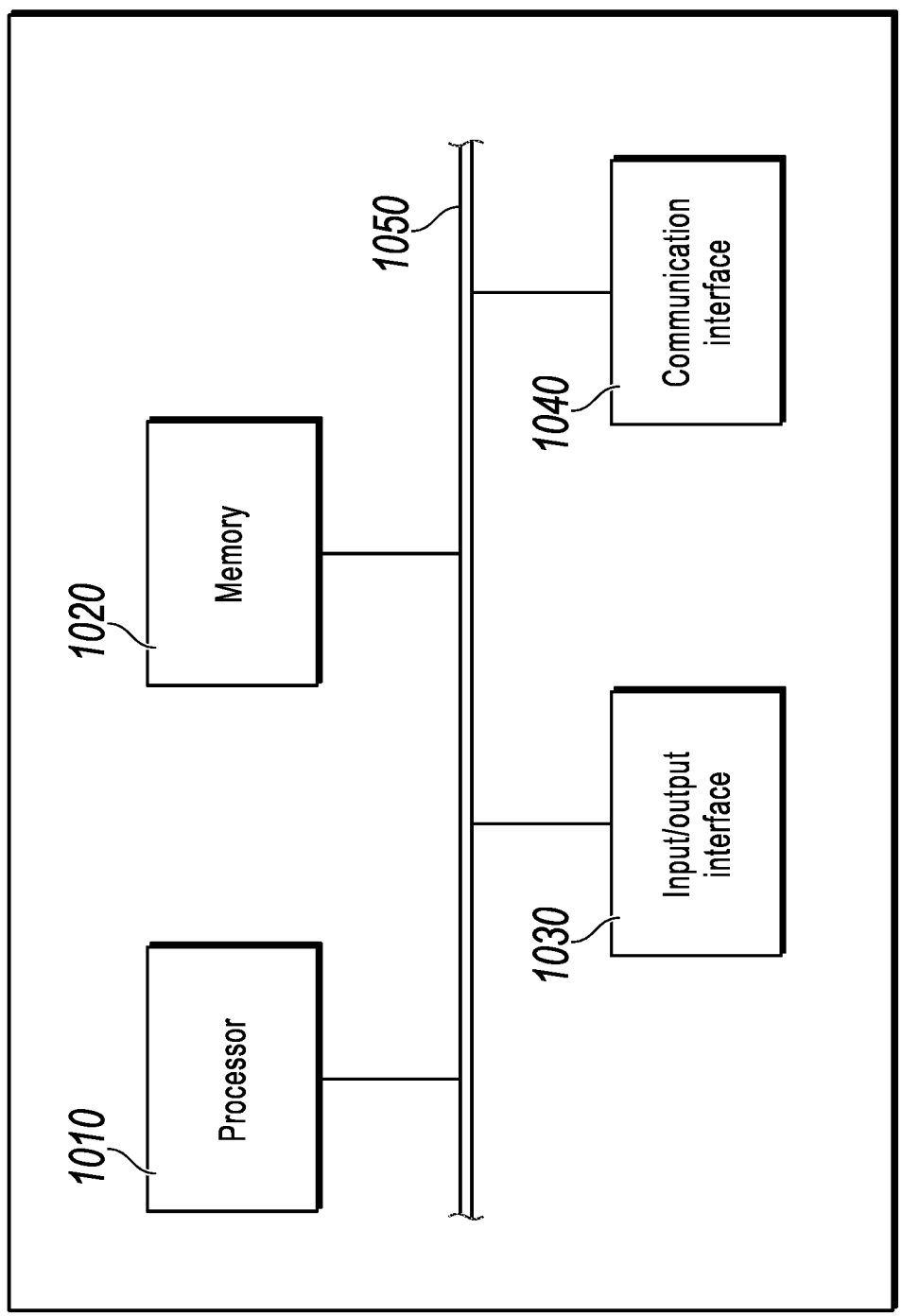
FIG. 7 is a structural schematic diagram of a device for configuring a method of some embodiments of the present specification.

FIG. 7 is a structural schematic diagram of a more specific computer device hardware according to some embodiments of the present specification. The device may include a processor 1010, a memory 1020, an input/output interface 1030, a communication interface 1040 and a bus 1050. The processor 1010, the memory 1020, the input/output interface 1030, and the communication interface 1040 communicate with each other via bus 1050 in the device.

The processor 1010 can be implemented by a general Central Processing Unit (CPU), a microprocessor, an Application Specific Integrated Circuit (ASIC), one or more integrated circuits or the like to execute relevant programs to implement the technical solutions in the embodiments of the present specification.

The memory 1020 can be implemented by Read Only Memory (ROM), Random Access Memory (RAM), static storage device, dynamic storage device and the like. The memory 1020 can store operating system or other application programs. When the technical solutions of the present disclosure are implemented by software or firmware, the relevant program codes are stored in the memory 1020 and invoked by the processor 1010.

The input/output interface 1030 is used to connect with an input/output module to realize information input and output. The input/output module can be configured as an assembly in the device (not shown), or externally connected with the device to provide corresponding functions. The input device may include keyboard, mouse, touch screen, microphone, various sensors and so on, and the output device can include display, loudspeaker, vibrator and indicator lamp and so on.

The communication interface 1040 is used to connect with the communication module (not shown) to realize communication interaction between the present device and other devices. The communication module can realize communication in a wired manner such as USB or network cable, or in a wireless manner such as mobile network, WIFI and Bluetooth.

The bus 1050 includes a passage which transmits information among various assemblies of the device such as the processor 1010, the memory 1020, the input/output interface 1020 and the communication interface 1040.

It is noted that although the above device only illustrates the processor 1010, the memory 1020, the input/output interface 1020, the communication interface 1040 and the bus 1050, the device can also include other assemblies necessary for normal running in a specific implementation. Further, it is appreciated for those skilled in the art that the above device may merely include the assemblies necessary for realizing the technical solution of the embodiments of the present specification without including all assemblies in drawings.

The embodiments of the present specification further provide a computer readable storage medium storing computer programs which are executed by the processor to implement the method of verifying the credibility of the consortium blockchain of FIG. 3.

The embodiments of the present specification further provide a computer readable storage medium storing computer programs which are executed by the processor to implement the method of processing a request in the consortium blockchain of FIG. 4.

The computer readable storage medium includes permanent and non-permanent, mobile and non-mobile media which may realize information storage by any method or technology. The information may be computer readable instructions, data structure, programmed modules or other data. The examples of the computer storage medium include but not limited to phase change random access memory (PRAM), static random access memory (SRAM), dynamic random access memory (DRAM), and other types of random access memories (RAM), Read only memory (ROM), Electrically Erasable Programmable Read-Only Memory (EEPROM), a Flash Memory, or other memory technology, CD-ROM, digital versatile disc (DVD) or other optical storage, cassette type magnetic tape, magnetic disk storage or other magnetic storage device or other non-transmission medium for storing information accessible by computing devices. As defined in the present disclosure, the computer readable storage medium does not include transitory media, such as modulated data signal or carrier.

As known from the above descriptions of the examples, persons skilled in the art can clearly know that the embodiments of the present specification can be implemented by software plus necessary general hardware platform. Based on such understanding, the technical scheme of the present disclosure essentially or a part contributing to the existing technology can be embodied in the form of a software product, the software product is stored in a storage medium such as ROM/RAM, magnetic disk and compact disk, and includes several instructions for enabling a computer device (such as a personal computer, a server or a network device) to execute all or part of the method disclosed by the embodiments of the present specification.

The system, method, module or unit described as above can be specifically implemented by a computer chip, or entity, or a product with a particular function. A typical realizing device is a computer, the specific form of which can be personal computer, laptop computer, cellular phone, camera phone, smart phone, personal digital assistant, media player, navigation device, e-mail transceiver, game console, tablet computer, wearable device or any several combinations of such devices.

The embodiments of the present specification are described progressively and reference can be made to each other for same or similar parts of various examples. Each example stresses the description of the differences from other examples. Since the apparatus embodiments substantially correspond to the method embodiments, a reference may be made to part of the descriptions of the method embodiments for the related part. The method embodiments described above are merely illustrative, where the modules described as separate members may be or not be physically separated. During implementation of the technical solutions of the present disclosure, the functions of various modules can be implemented in one or more software and/or hardware or part or all modules are used to implement the purpose of the embodiments of the present specification according to actual needs. Those of ordinary skill in the art can understand and carry out them without creative work.

The previous descriptions are merely made to the specific embodiments of the present specification. It should be pointed out that several improvements or modifications made by those skilled in the art without departing from the principle of the embodiments of the present specification shall fall within the scope of protection of the present disclosure.

The invention claimed is:

1. A computer-implemented method, comprising:
   obtaining, by a client device of a consortium blockchain that comprises a plurality of nodes, respective addresses of the plurality of nodes;
   sending, by the client device, a simplified payment verification (SPV) request to each node of the plurality of nodes based on the respective addresses of the plurality of nodes, wherein each SPV request comprises a digest hash of a transaction, and wherein sending the SPV request to each node of the plurality of nodes comprises:
   determining, for each node of the plurality of nodes, whether a number of times of sending the SPV request to the node has reached a threshold, and in response to determining that the number of times has reached the threshold, sending the SPV request to the node after a predetermined delay;

receiving, at the client device, a respective verification result returned by each node of the plurality of nodes that received the SPV request, wherein the respective verification result is generated by each node based on performing SPV verification of the digest hash to verify whether the transaction is recorded in the consortium blockchain; and determining, by the client device, credibility of the consortium blockchain based on a consistency degree of the respective verification results returned by the plurality of nodes.

2. The computer-implemented method of claim 1, wherein obtaining the respective addresses of the plurality of nodes in the consortium blockchain comprises:

randomly obtaining, by the client device, the respective addresses of the plurality of nodes in the consortium blockchain.

3. The computer-implemented method of claim 1, wherein obtaining the respective addresses of the plurality of nodes in the consortium blockchain comprises:

obtaining, by the client device, the respective addresses of the plurality of nodes, the respective addresses each including an address of a node associated with the client device in the consortium blockchain.

4. The computer-implemented method of claim 1, further comprising:

sending, by the client device, a transaction position inquiry request to each node of the plurality of nodes based on the respective addresses of the plurality of nodes, wherein the transaction position inquiry request comprises the digest hash of the transaction;

receiving, at the client device, a respective position inquiry result returned by each node of the plurality of nodes that received the transaction position inquiry request, wherein the respective position inquiry result is generated by each node based on inquiring position information of the transaction that corresponds to the digest hash in the consortium blockchain; and verifying, by the client device, the credibility of the consortium blockchain comprising transaction information based on a degree of consistency of the respective position inquiry results returned by the plurality of nodes.

5. The computer-implemented method of claim 1, further comprising, prior to obtaining the respective addresses of the plurality of nodes:

determining, by each node of the plurality of nodes in the consortium blockchain, a corresponding whitelist; and broadcasting, by each node of the plurality of nodes in the consortium blockchain, the corresponding whitelist to other nodes in the consortium blockchain.

6. The computer-implemented method of claim 5, further comprising:

determining, by each node of the plurality of nodes in the consortium blockchain, that a client device identifier included in the SPV request is not in the corresponding whitelist, wherein the SPV request comprises the digest hash of the transaction or the client device identifier or both; and in response, rejecting to perform the SPV verification.

7. The computer-implemented method of claim 1, further comprising:

determining, by each node of the plurality of nodes in the consortium blockchain, a first number of times that the node has processed a SPV request initiated by other nodes;

determining, by each node of the plurality of nodes in the consortium blockchain, a second number of times that the other nodes have processed a SPV request initiated by the node; and determining whether to process the SPV request in delay based on the first number of times and the second number of times.

8. A computer-implemented system, comprising:

one or more computers; and one or more computer memory devices interoperably coupled with the one or more computers and having tangible, non-transitory, machine-readable media storing one or more instructions that, when executed by the one or more computers, perform operations comprising:

obtaining, by a client device of a consortium blockchain that comprises a plurality of nodes, respective addresses of the plurality of nodes;

sending, by the client device, a simplified payment verification (SPV) request to each node of the plurality of nodes based on the respective addresses of the plurality of nodes, wherein each SPV request comprises a digest hash of a transaction, and wherein sending the SPV request to each node of the plurality of nodes comprises:

determining, for each node of the plurality of nodes, whether a number of times of sending the SPV request to the node has reached a threshold, and in response to determining that the number of times has reached the threshold, sending the SPV request to the node after a predetermined delay;

receiving, at the client device, a respective verification result returned by each node of the plurality of nodes that received the SPV request, wherein the respective verification result is generated by each node based on performing SPV verification of the digest hash to verify whether the transaction is recorded in the consortium blockchain; and determining, by the client device, credibility of the consortium blockchain based on a consistency degree of the respective verification results returned by the plurality of nodes.

9. The computer-implemented system of claim 8, wherein obtaining the respective addresses of the plurality of nodes in the consortium blockchain comprises:

randomly obtaining, by the client device, the respective addresses of the plurality of nodes in the consortium blockchain.

10. The computer-implemented system of claim 8, wherein obtaining the respective addresses of the plurality of nodes in the consortium blockchain comprises:

obtaining, by the client device, the respective addresses of the plurality of nodes, the respective addresses each including an address of a node associated with the client device in the consortium blockchain.

11. The computer-implemented system of claim 8, wherein the operations further comprise:

sending, by the client device, a transaction position inquiry request to each node of the plurality of nodes based on the respective addresses of the plurality of nodes, wherein the transaction position inquiry request comprises the digest hash of the transaction;

receiving, at the client device, a respective position inquiry result returned by each node of the plurality of nodes that received the transaction position inquiry request, wherein the respective position inquiry result is generated by each node based on inquiring position information of the transaction that corresponds to the digest hash in the consortium blockchain; and verifying, by the client device, the credibility of the consortium blockchain comprising transaction information based on a degree of consistency of the respective position inquiry results returned by the plurality of nodes.

12. The computer-implemented system of claim 8, wherein the operations further comprise, prior to obtaining the respective addresses of the plurality of nodes:

determining, by each node of the plurality of nodes in the consortium blockchain, a corresponding whitelist; and broadcasting, by each node of the plurality of nodes in the consortium blockchain, the corresponding whitelist to other nodes in the consortium blockchain.

13. The computer-implemented system of claim 12, wherein the operations further comprise:

determining, by each node of the plurality of nodes in the consortium blockchain, that a client device identifier included in the SPV request is not in the corresponding whitelist, wherein the SPV request comprises the digest hash of the transaction or the client device identifier or both; and in response, rejecting to perform the SPV verification.

14. The computer-implemented system of claim 8, wherein the operations further comprise:

determining, by each node of the plurality of nodes in the consortium blockchain, a first number of times that the node has processed a SPV request initiated by other nodes;

determining, by each node of the plurality of nodes in the consortium blockchain, a second number of times that the other nodes have processed a SPV request initiated by the node; and determining whether to process the SPV request in delay based on the first number of times and the second number of times.

15. A non-transitory, computer-readable medium storing one or more instructions executable by a computer system to perform operations comprising:

obtaining, by a client device of a consortium blockchain that comprises a plurality of nodes, respective addresses of the plurality of nodes;

sending, by the client device, a simplified payment verification (SPV) request to each node of the plurality of nodes based on the respective addresses of the plurality of nodes, wherein each SPV request comprises a digest hash of a transaction, and wherein sending the SPV request to each node of the plurality of nodes comprises:

determining, for each node of the plurality of nodes, whether a number of times of sending the SPV request to the node has reached a threshold, and in response to determining that the number of times has reached the threshold, sending the SPV request to the node after a predetermined delay;

receiving, at the client device, a respective verification result returned by each node of the plurality of nodes that received the SPV request, wherein the respective verification result is generated by each node based on performing SPV verification of the digest hash to verify whether the transaction is recorded in the consortium blockchain; and determining, by the client device, credibility of the consortium blockchain based on a consistency degree of the respective verification results returned by the plurality of nodes.

16. The non-transitory, computer-readable medium of claim 15, wherein obtaining the respective addresses of the plurality of nodes in the consortium blockchain comprises:

randomly obtaining, by the client device, the respective addresses of the plurality of nodes in the consortium blockchain.

17. The non-transitory, computer-readable medium of claim 15, wherein obtaining the respective addresses of the plurality of nodes in the consortium blockchain comprises:

obtaining, by the client device, the respective addresses of the plurality of nodes, the respective addresses each including an address of a node associated with the client device in the consortium blockchain.

18. The non-transitory, computer-readable medium of claim 15, wherein the operations further comprise:

sending, by the client device, a transaction position inquiry request to each node of the plurality of nodes based on the respective addresses of the plurality of nodes, wherein the transaction position inquiry request comprises the digest hash of the transaction;

receiving, at the client device, a respective position inquiry result returned by each node of the plurality of nodes that received the transaction position inquiry request, wherein the respective position inquiry result is generated by each node based on inquiring position information of the transaction that corresponds to the digest hash in the consortium blockchain; and verifying, by the client device, the credibility of the consortium blockchain comprising transaction information based on a degree of consistency of the respective position inquiry results returned by the plurality of nodes.

* * * * *